E. JAGELS.
WASTE PIPE CONNECTION.
APPLICATION FILED SEPT. 30, 1915.
1,185,676.
Patented June 6, 1916.
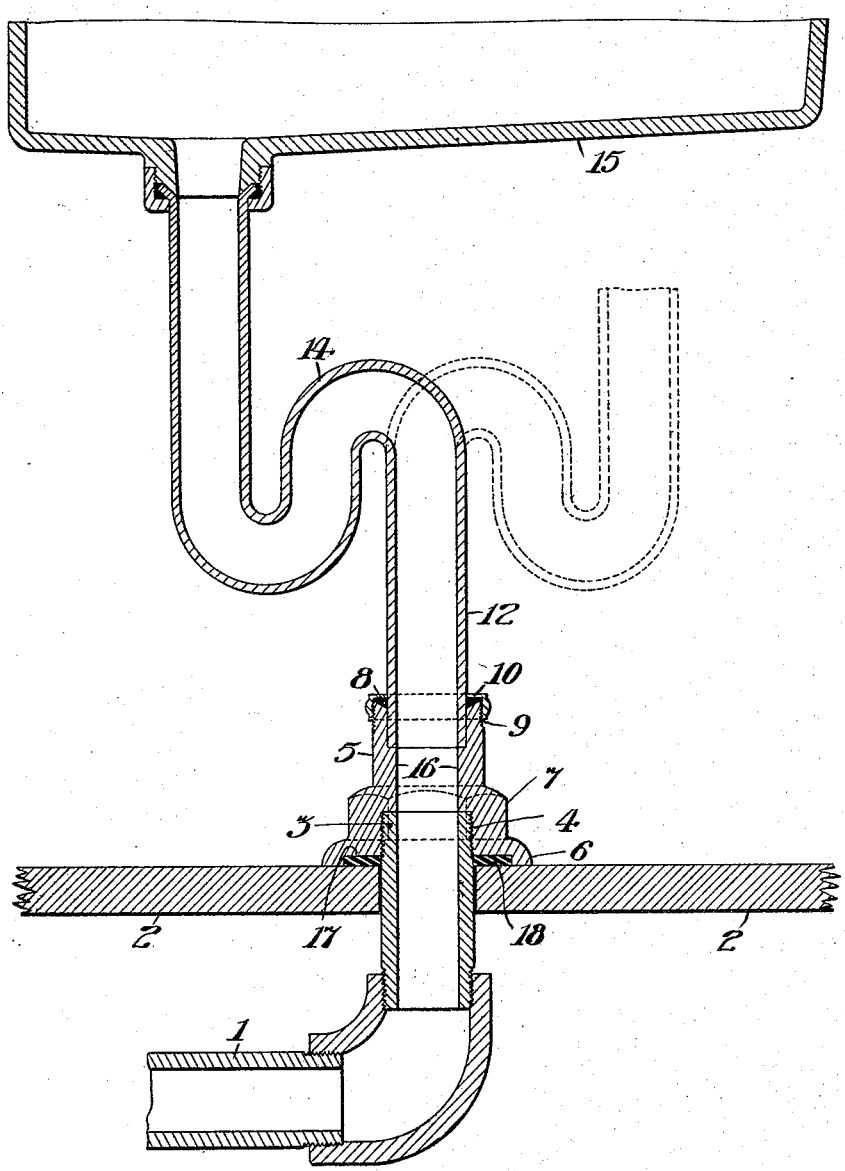

UNITED STATES PATENT OFFICE.

EDWARD JAGELS, OF PHILADELPHIA, PENNSYLVANIA.

WASTE-PIPE CONNECTION.

1,185,676.  Specification of Letters Patent.  Patented June 6, 1916.

Application filed September 30, 1915. Serial No. 53,258.

*To all whom it may concern:*

Be it known that I, EDWARD JAGELS, a citizen of the United States, residing at Philadelphia, in the State of Pennsylvania, have invented a certain new and useful Improvement in Waste-Pipe Connections, whereof the following is a specification, reference being had to the accompanying drawing.

It is usual to make connection from iron waste pipes to wash basins, sinks and similar plumbing devices, by means of lead pipe extending through the floor beneath such devices and soldered to an iron pipe.

The present invention is designed to avoid the use of such lead pipe connections by extending the iron waste pipe through the floor and providing it above the latter with a coupling having a screw thread for connection with the iron pipe, a flange serving as an abutment against the floor to hold said iron pipe in adjusted position, and a stuffing box at the top of said coupling whereby a slip joint, adjustable both longitudinally and circumferentially may be made with the fittings of the plumbing device, for instance, an S trap or a straight connecting tube.

My invention includes the various novel features of construction and arrangement hereinafter more definitely specified.

The drawing is a fragmentary vertical sectional view showing a typical embodiment of my invention connecting a sink with a waste pipe.

In said drawing; the iron waste pipe 1 is extended beneath the floor 2 from the riser in or at the vertical wall of the building, in lieu of the lead pipe heretofore employed, and has its screw threaded end 3 projecting above said floor in position to engage the screw threaded socket 4 in the coupling 5 which has the floor flange 6 extending transversely to the axis of said coupling and bearing upon said floor, serving as an abutment to hold said pipe 1 in adjusted position. Said coupling 5 is provided with a wrench hold by which it may be turned; conveniently a portion 7 of its exterior surface which is hexagonal as indicated by the dottel lines in the drawing. The upper end of said coupling 5 is recessed to receive the packing 8 and provided with an exterior screw thread 9 to receive the cap collar 10 by which said packing may be adjustably compressed to seal the joint between said coupling and the tube 12 which may be the lower end of an S trap 14, as illustrated, or may be any other suitable conduit leading from a plumbing device; for instance, the sink 15 indicated in said drawing.

It may be observed that the ordinary lead pipe connection involves two soldered joints respectively at the riser beneath the floor and at the opening in the floor, and that my improved connection saves the labor and cost of both said joints. Moreover, such soldered connections of course prevent any adjustment of the pipe above the floor after they are made and, therefore, it is necessary with said lead pipe connections to break and remake the soldered joint at the opening in the floor to effect any adjustment either longitudinally or circumferentially. On the contrary, my connection permits longitudinal and circumferential adjustment of whatever conduit is secured in the upper end of the coupling, so as to not only facilitate connection with the plumbing device but readily permit of changes in the location of the latter. In other words; if lead pipe connections are made and located in the usual way with reference to architectural plans, and the plumbing fixtures (tubs, sinks, basins, etc.) are not located in precise accordance with the plans, as is frequently the case, it is necessary to break and remake the soldered joints of the lead pipe connection in order to compensate for the change in location, and all such extra work and expense is avoided by the use of my invention, whereby the iron waste pipe is brought to a terminal fitting above the floor, without any soldered joints and is there provided with means for connection with a conduit of any kind, adjustable in any direction, and without a soldered connection.

It is to be particularly noted that, whereas it is extremely difficult to make a soldered connection without leaving either a projection extending inwardly or a crevice opening outwardly beyond the normal internal diameter of the lead pipe, either of which induce the lodgment of elements of sewage, such as bits of string, hair, paper, etc., which ultimately clog the outlet; no such obstruction is possible in my invention because both the end 3 of the iron waste pipe and the tube 12 are normally straight and smooth internally and the space between them is filled by the neck flange 16 of said coupling which has an axial opening therethrough of the same internal diameter as said pipe end 3 and said tube 12, at its ends respectively adjoining them. Moreover, the ordinary lead pipe connection aforesaid is covered at the floor by a loose pressed sheet metal collar which permits any water spilled upon the floor to flow down the hole in the latter and damage the subjacent ceiling. Therefore, I prefer to provide my coupling with a recess 17 at the bottom thereof in which a washer 18, of resilient rubber or other suitable packing material, may be presented in position to prevent passage of water down the hole in the floor. Therefore, I do not desire to limit myself to the precise details of construction and arrangement herein set forth as it is obvious that various modifications may be made therein without departing from the essential features of my invention as defined in the appended claims.

I claim:—

1. The combination with a waste pipe having a screw threaded end extending through an opening in a floor; of a plumbing device outlet conduit, in axial alinement with said waste pipe; a coupling having an axial opening therethrough, with a neck flange intermediate of said pipe and conduit of the same internal diameter as said pipe and conduit at its respective junctions therewith, said coupling having an internal screw threaded socket at the lower end thereof engaging said pipe end, a floor flange projecting transversely to the axis of said coupling, adapted to bear upon said floor and forming an abutment holding said pipe in adjusted position, a washer recess in the bottom of said coupling, adjacent said floor; a resilient packing washer in said recess forming a water-tight joint between said coupling and said floor; a hexagonal wrench hold upon the exterior of said coupling, above said floor flange, an internal annular packing recess in the upper end of said coupling, surrounding said conduit, and an external screw thread upon the upper end of said coupling; an annular packing in said recess, surrounding said conduit; a cap collar having an internal screw thread engaging said external screw thread on said coupling, and adapted to compress said packing; whereby, said waste pipe is held in predetermined position with respect to said floor and said conduit is held in longitudinally and circumferentially adjustable connection with said waste pipe.

2. The combination with a waste pipe having a screw threaded end extending through an opening in a floor; of a plumbing device outlet conduit, in axial alinement with said waste pipe; a coupling having an axial opening therethrough, with a neck flange intermediate of said pipe and conduit of the same internal diameter as said pipe and conduit at its respective junctions therewith, said coupling having an internal screw threaded socket at the lower end thereof engaging said pipe end, a floor flange projecting transversely to the axis of said coupling, adapted to bear upon said floor and forming an abutment holding said pipe in adjusted position, a wrench hold upon the exterior of said coupling, above said floor flange, an internal annular packing recess in the upper end of said coupling, surrounding said conduit, and an external screw thread upon the upper end of said coupling; an annular packing in said recess, surrounding said conduit; a cap collar having an internal screw thread engaging said external screw thread on said coupling, and adapted to compress said packing; whereby, said waste pipe is held in predetermined position with respect to said floor and said conduit is held in longitudinally and circumferentially adjustable connection with said waste pipe.

3. The combination with a waste pipe having a screw threaded end extending through an opening in a floor; of a coupling having an axial opening therethrough, with a neck flange above said pipe of the same internal diameter as said pipe at its junction therewith, said coupling having an internal screw threaded socket at the lower end thereof engaging said pipe end, a floor flange projecting transversely to the axis of said coupling, adapted to bear upon said floor and forming an abutment holding said pipe in adjusted position, an internal annular packing recess in the upper end of said coupling, surrounding said axial opening, and an external screw thread upon the upper end of said coupling; an annular packing in said recess; and a cap collar having an internal screw thread engaging said external screw thread on said coupling, and adapted to compress said packing; whereby, said waste pipe is held in predetermined position with respect to said floor.

4. In a waste pipe connection, the combination with a coupling having an axial opening therethrough, an internal screw threaded socket at the lower end thereof adapted to engage a standard iron waste pipe, a neck flange intermediate of its length of the same internal diameter as said pipe at its junction therewith, a floor flange projecting transversely to the axis of said coupling, adapted to bear upon said floor and forming an abutment holding said pipe in adjusted position, a wrench hold upon the exterior of said coupling, above said floor flange, an internal annular packing recess in the upper end of said coupling, surrounding said opening, and an external screw thread upon the upper end of said coupling; of an annular packing in said recess; and a cap collar having an internal screw thread engaging said external screw thread on said coupling, and adapted to compress said packing.

5. In a waste pipe connection, the combination with a coupling having an axial opening therethrough, an internal screw threaded socket at the lower end thereof adapted to engage a standard iron waste pipe, a neck flange intermediate of its length of the same internal diameter as said pipe at its junction therewith, a floor flange projecting transversely to the axis of said coupling, adapted to bear upon said floor and forming an abutment holding said pipe in adjusted position, and a wrench hold upon the exterior of said coupling, above said floor flange; of a stuffing box at the top of said coupling; whereby a slip joint, adjustable both longitudinally and circumferentially, may be made with the outlet conduit of a plumbing device such as a wash basin or sink.

6. In a waste pipe connection, the combination with a coupling having an axial opening therethrough, an internal screw threaded socket at the lower end thereof adapted to engage a standard iron waste pipe, a neck flange intermediate of its length of the same internal diameter as said pipe at its junction therewith, and a floor flange projecting transversely to the axis of said coupling, adapted to bear upon said floor and forming an abutment holding said pipe in adjusted position; of annular means at the top of said coupling, adapted to seal a joint between said coupling and the outlet conduit of a plumbing device such as a wash basin or sink.

In testimony whereof, I have hereunto signed my name at Philadelphia, Pennsylvania, this 25th day of September, 1915.

EDWARD JÄGELS.

Witnesses:
DANIEL E. SHISLER,
JOHN W. SHISLER.

Copies of this patent may be obtained for five cents each, by addressing the "Commissioner of Patents, Washington, D. C."